United States Patent [19]

Harrison

[11] Patent Number: 4,709,729

[45] Date of Patent: Dec. 1, 1987

[54] PIPE WELD REPAIR DEVICE AND METHOD FOR THE INSTALLATION THEREOF

[75] Inventor: George W. Harrison, Houston, Tex.

[73] Assignee: Team, Inc., Alvin, Tex.

[21] Appl. No.: 820,235

[22] Filed: Jan. 21, 1986

Related U.S. Application Data

[63] Continuation of Ser. No. 657,192, Oct. 3, 1984, abandoned.

[51] Int. Cl.$^4$ .............................................. F16L 55/16
[52] U.S. Cl. ....................................... 138/99; 228/119
[58] Field of Search .......... 24/284; 29/402.09, 402.14, 29/402.15, 402.18, 447; 138/92, 99; 228/18, 44.3, 119, 151, 175, 199, 212; 285/16, 381; 403/273

[56] References Cited

U.S. PATENT DOCUMENTS

| | | | |
|---|---|---|---|
| Re. 10,877 | 10/1887 | Wilbur | 285/381 X |
| 689,455 | 12/1901 | Bickford | 29/447 |
| 2,984,899 | 5/1961 | Richter et al. | 29/447 |
| 3,550,638 | 12/1970 | Smith | 138/99 |
| 3,685,545 | 8/1972 | Smith et al. | 138/99 |
| 3,954,288 | 5/1976 | Smith | 138/99 X |

*Primary Examiner*—Stephen Marcus
*Assistant Examiner*—Mark Thronson
*Attorney, Agent, or Firm*—Guy E. Matthews

[57] ABSTRACT

A pipe weld repair structure adapted to seal leaks or cracks at a weld circumferentially disposed in a pipe. Includes at least two pipe clamp segments disposed around the pipe and connected together to form complete clamp. Each clamp segment defines two inner surfaces adapted to be in contact with outer surface of pipe when clamps are connected together around pipe. Each clamp segment defines an inner grooved recess disposed between inner surfaces and adapted to enclose a weld circumferentially disposed around pipe when clamps are connected together around pipe. Clamp segments define an internal diameter when clamp segments are connected to form complete clamp. Internal diameter is conventional fit around pipe while clamp segments are at sufficiently high temperature to cause thermal expansion. Internal diameter is a shrink fit around the surfaces of pipe after clamp segments are connected together while at sufficiently high temperature and subsequently allowed to cool to same temperature as pipe. Bolted flanges are adapted to connect clamp segments together in sealed relationship to form complete clamp and to retain shrink fit of clamp around pipe. Ports provided in clamp segments permit entry of a liquid sealant into recess. Inner surfaces may be serrated as by knurling for more gripping power.

10 Claims, 2 Drawing Figures

PIPE WELD REPAIR DEVICE AND METHOD FOR THE INSTALLATION THEREOF

This is a continuation of application Ser. No. 657,192, filed Oct. 3, 1984, now abandoned.

BACKGROUND OF THE INVENTION

This invention relates to a repair device for repairing pipe welds. More particularly, the present invention relates to a device for repairing pipe welds utilizing a shrink-fit clamping means.

DESCRIPTION OF THE PRIOR ART

In certain industrial enterprises, such as in the nuclear industry, a phenomena known as intergranular stress corrosion cracking (IRSCC), i.e. pipe cracking, has reached epidemic proportions. Recent inspections by the Nuclear Regulatory Commission (NRC) has revealed the widespread cracking of recirculation and residual-heat-removing piping of boiling water reactors (BWR) at a number of nuclear power facilities. It has been theorized that the high carbon content of the stainless steel piping generally used in the industry is not satisfactory. Replacement of this steel piping, however, would detail a cost of tens of millions of dollars. Certain nuclear facilities have begun to install weld overlays to reinforce present welds in an attempt to obviate this cracking problem. This procedure, unfortunately, has also proven to be inordinately expensive and time-consuming.

Pipe repair clamps have been previously revealed in the art. One such clamp was disclosed in U.S. Pat. No. 3,183,938 issued to T. C. Smith et al. Therein is provided a low bolt pipe repair clamp of the malleable band type wherein the force of the bolts and nuts acting to bring opposing lug members together is caused by the ends of the band pulling on the lug such that lug tipping movement is eliminated.

U.S. Pat. No. 2,776,153 issued to T. C. Smith details an armored gasket for a pipe repair clamp which distributes clamp pressure evenly about the troublesome area near the ends of the clamp so as to eliminate problems which arise because of the tendency of clamp sleeves or bands to dig into the gasket.

Further, U.S. Pat. No. 2,899,984 reveals a pipe sleeve and gasket useful in eliminating the difficulty in sealing straight and circular gasket sections together.

While these devices appear to be somewhat effective, they are lacking when utilized to correct the above-delineated problem.

SUMMARY OF THE INVENTION

Thereupon, it is an object of this invention to provide an economical means for repairing defective pipe welds.

It is another object of the present invention to provide a pipe repair device which will reduce the stress in welds, and thereby reduce or eliminate stress corrosion cracking.

These and other objects of the present invention will be best understood upon a reading of the following detailed description taken in connection with the accompanying drawings which form part of the specification.

In summary, the pipe weld repair structure of the present invention is adapted to seal leaks or cracks at a weld circumferentially disposed in a pipe and includes the pipe with at least two pipe clamp segments disposed around the pipe and connected together to form a complete clamp. Each clamp segment defines two inner surfaces adapted to be in contact with the outer surface of the pipe when the clamps are connected together around the pipe. Each clamp segment defines an inner grooved recess disposed between the inner surfaces and adapted to enclose a weld circumferentially disposed around the pipe when the clamps are connected together around the pipe. The inner surfaces of the clamp segments define an internal diameter when the clamp segments are connected to form the complete clamp. The internal diameter is a conventional fit around the surfaces of the pipe while the clamp segments are at a sufficiently high temperature to cause thermal expansion. The internal diameter is a shrink fit around the surfaces of the pipe after the clamp segments are connected together while at the sufficiently high temperature and subsequently allowed to cool to the same temperature as the pipe. Bolted flanges connect the clamp segments together in sealed relationship to form the complete clamp before the clamp segments are cooled to retain the shrink fit of the clamp around the pipe. Access openings are provided in the clamp segments to permit entry of a liquid sealant into the recess.

DESCRIPTION OF THE PREFERRED EMBODIMENTS

The present invention remedies the problems of the prior art by providing a pipe weld repair clamp and method for the installation thereof. The clamp includes a divided clamp frame made up of a plurality of frame segments positionable in end-to-end relation about the pipe and pipe weld. Each segment details a recess around its inner periphery with each recess being an integral part of the segment. Means are used to connect the frame segments to one another when positioned in end-to-end relation so that the recess extending circumferentially along the interior of each frame segment aligns with the next adjacent end-to-end recess to form a complete annular recess. Access means are provided in the frame to permit passage of a liquid sealant into the recess to form a self-energizing seal between the clamp frame and the pipe. When assembled, the clamp defines an inside diameter which fits the outside diameter of the pipe to which the clamp is to be applied only when the assembled clamp is at a temperature sufficiently above the temperature of the pipe. The clamp is preferably provided of a material having an expansion factor substantially similar or the same as that of the pipe upon which it is to be installed.

The clamp segments are appropriately tapered so as to reduce stress concentrations on their ends, and are preferably serrated on their inner peripheral surfaces to provide greater gripping power and to prevent radical movement thereof.

Figure 1:
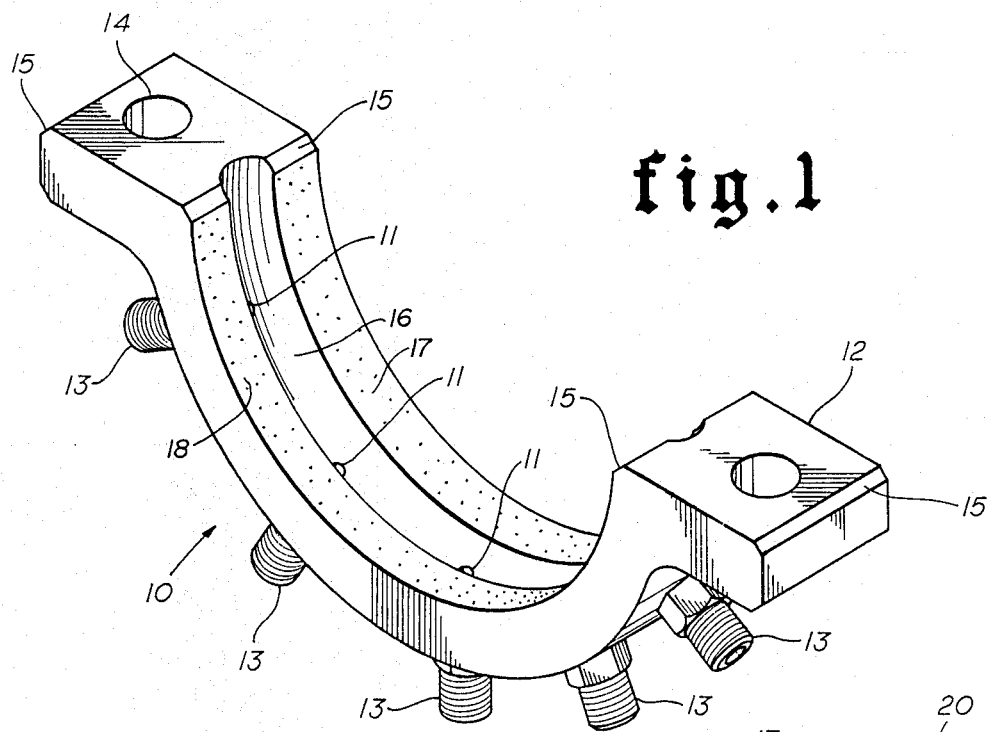
FIG. 1 is a perspective view showing a clamp frame segment constructed according to the present invention.

Referring now to FIG. 1, a perspective view of a segment of the pipe weld repair clamp constructed according to the present invention is shown. The clamp comprises a frame constructed from a plurality of frame or clamp segments 10 which are positioned and clamped in end-to-end relation about the pipe and pipe weld. The clamp segments 10 are preferably semi-circular in shape.

Each segment 10 defines means for connecting the frame segments to one another when positioned in end-to-end relation. Preferably, this connecting means is an end flange 12, positioned on each end of the semi-circular frame segment 10, which has apertures or bolt holes 14 extending therethrough, such flanges, upon assembly, forming an annular sealing surface. In the preferred embodiment of the present invention, the end flanges are tapered as at 15 so as to reduce stress concentrations at the clamp ends.

The inner periphery of each clamp segment 10 is serrated or knurled as represented by stippling 17, to provide greater gripping power when the clamp is assembled about the pipe and pipe weld. Extending longitudinally along the knurled inner periphery of each clamp segment 10 is an end-to-end grooved recess 16 which is defined as an integral part of each segment. The recess 16 of each clamp segment 10 is adapted to fit over a portion of the pipe weld so that when the clamp segments are appropriately connected, the recesses form an annular recess therebetween to fit over the entire circumferential pipe weld.

Access means 13 are provided in the clamp frame for permitting the passage of a liquid sealant into the recess 16. Preferably, the access means 13 are provided on each frame segment 10, and is a plurality of radial ports or passageways 11 which extend radially from the outside of the segment into the recess 16 with a nipple 13 for each port 11 mounted to the segment 10. As liquid sealant is injected into the recess 16, the flow comes into contact with the pipe weld to form a self-energizing seal between the repair clamp and the pipe weld.

Figure 2:
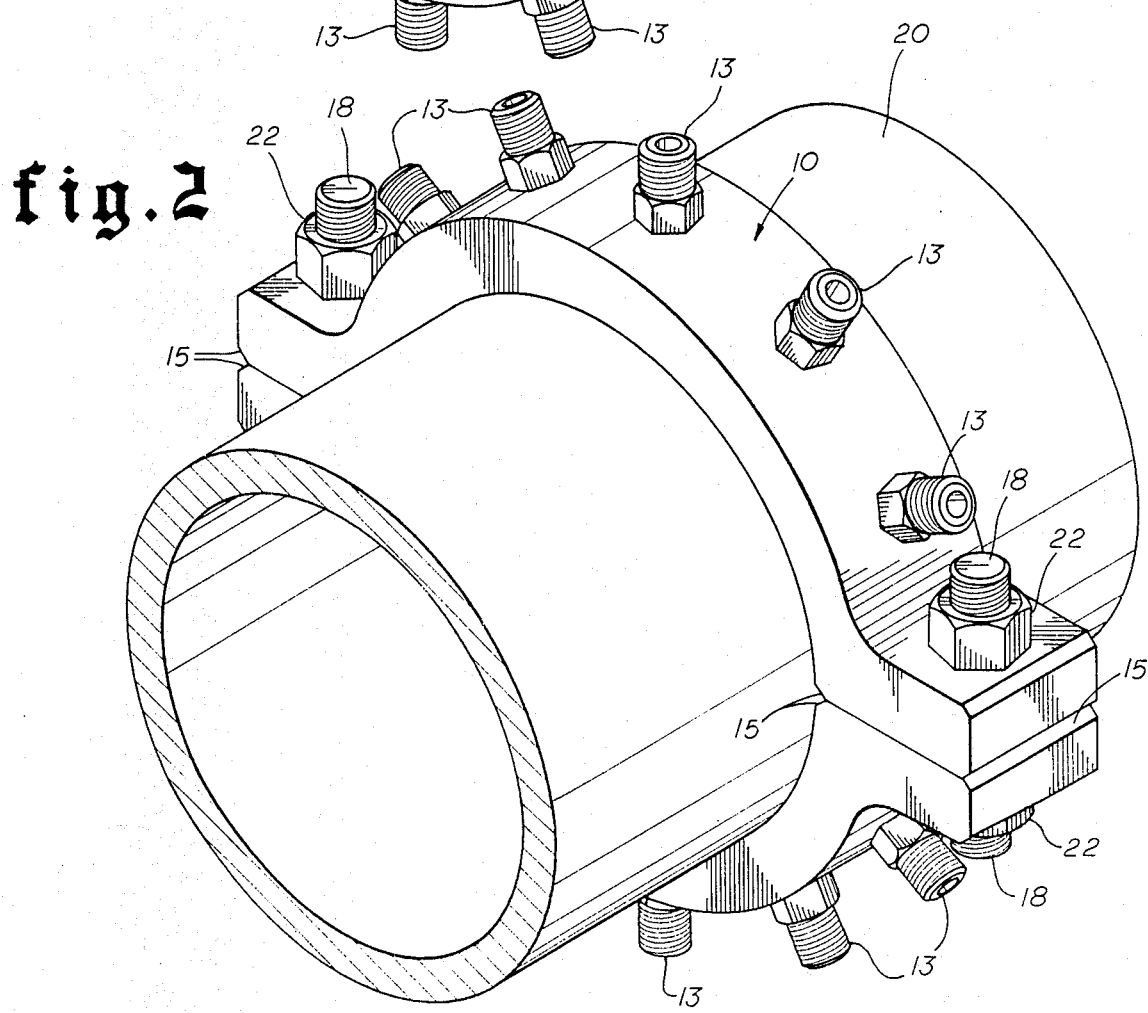
FIG. 2 is an elevational view of the invention installed around a pipe and pipe weld.

As shown in FIG. 2, the pipe repair clamp of FIG. 1 is shown positioned in end-to-end relation about a pipeline 20, and more specifically, about a pipe weld (not shown) on pipeline 20. The flanges 12 of the clamp segments 10 are held securely together by means of flange bolts 18 and flange bolt nuts 22. When a leak develops in a pipe weld, the pipe weld repair clamp seals such leak when positioned about the pipe and pipe weld as illustrated. Frame segments 10 are positioned and centered about the periphery of the pipe 20 with the annular recess 16 being placed over the outer surface of the leaking pipe weld. Bolts 18 are then extended through bolt holes 14 and the bolt nuts 22 are screwed thereonto for bringing the segments 10 into sealing engagement. A liquid sealant is then introduced into the annular recess by means of a pressurized injection system, which is fitted to the nipple 13.

Preferably, when the clamp segments 10 are assembled about the pipe 20 to form the pipe weld repair clamp of the present invention, the inside diameter of the clamp is less than the outside diameter of the pipe on which the clamp is to be installed. The reasons for such a clamp configuration will become more apparent from a further reading of the method of installation of the pipe repair clamp of the present invention as detailed hereinbelow.

In installing the pipe weld repair clamp detailed herein, it is first necessary to heat the clamp segments 10 at a temperature sufficient to cause the segments 10 to undergo thermal expansion. Once expanded, the clamp segments are assembled and centered about the circumferential pipe weld with the annular recess 16 being placed over the pipe weld. The bolts 18 are then extended through the bolt holes 14, and the bolt nuts 22 are screwed thereunto to bring the segments 10 into sealing engagement. The clamp is allowed to shrink fit and around the pipe. A liquid sealant is then introduced into the annular recess. Shrinking the clamp provides a 3.6 times greater resistance to slippage over the normal press fit.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interrupted as illustrative and not in a limiting sense.

What is claimed:

1. A method of forming an assembly, the assembly including: a pipe; at least two pipe clamp segments disposed around said pipe and connected together with connector means to form a complete clamp; said clamp segment of said clamp segment defining two inner surfaces adapted to be in direct contact with the outer surface of said pipe when said clamp is connected around said pipe; each clamp segment of said clamp segments defining an inner grooved recess disposed between said inner surfaces and adapted to enclose a weld circumferentially disposed around said pipe with said clamp being connected around said pipe; said inner surfaces of said clamp segments defining an internal diameter when said clamp segments are connected to form said complete clamp; said internal diameter being movable around the outside diameter of said pipe while said clamp segments as connected together are at a sufficiently high temperature above the temperature of said pipe to be thermally expanded; and said internal diameter being reduced to a fixed shrink connection around the outside diameter of said pipe after said clamp segments are allowed to cool from said high temperature to the same temperature of said pipe; the method including the steps of:
    (a) heating said clamp segments to a temperature sufficiently above the temperature of said pipe to cause appropriate thermal expansion of said clamp segments;
    (b) connecting said clamp segments together while heated to form said clamp disposed around said pipe and covering a circumferential crack in said pipe; and
    (c) pausing to allow the temperature of said clamp segments and said pipe to equalize with consequent shrinking of said clamp into a tight shrink connection with said pipe.

2. The method of claim 1 wherein access means are provided in said clamp segments to permit entry of a liquid sealant into said grooved recess.

3. The method of claim 1 wherein said connector means comprises flanges defined at the end of each clamp segment to form a pair of flanges on each side of said pipe which are bolted together.

4. The method of claim 1 wherein said clamp segments are formed of metal having a thermal expansion factor substantially the same as said pipe.

5. The method of claim 1 wherein said inner surfaces are serrated to provide increased gripping power.

6. The method of claim 5 wherein said inner surfaces are serrated by knurling.

7. The method of claim 5 wherein said internal diameter is slightly less than said outside diameter of said pipe when said pipe and said connected clamp are at the same temperature to enhance said gripping power.

8. The method of claim 1 further including filling said grooved recess with a liquid sealant.

9. The method of claim 2 further including filling said grooved recess through said access means with a liquid sealant.

10. The method of claim 1 wherein access means are provided in said clamp segments to permit entry of a liquid sealant into said grooved recess; said connector means comprises flanges defined at the ends of each clamp segment to form a pair of flanges on each side of said pipe which are bolted together; said clamp segments are formed of metal having a thermal expansion factor substantially the same as said pipe; said inner surfaces are serrated by knurling; and said internal diameter is slightly less than said outside diameter of said pipe when said pipe and said connected clamp are at the same temperature to provide said shrink fit connection.

* * * * *